US005699069A

United States Patent [19]

Faulkner

[11] Patent Number: 5,699,069

[45] Date of Patent: Dec. 16, 1997

[54] PLURAL BEAM REDUCTION OF MULTIPATH REFLECTIONS

[75] Inventor: John M. Faulkner, Rockledge, Fla.

[73] Assignee: Northrop Grumman Corporation, Los Angeles, Calif.

[21] Appl. No.: 699,272

[22] Filed: Aug. 19, 1996

[51] Int. Cl.[6] .......... H04B 7/185

[52] U.S. Cl. .......... 342/352; 455/13.1

[58] Field of Search .......... 342/354, 352, 342/353, 356; 455/13.1, 13.4, 52.3, 65

[56] References Cited

U.S. PATENT DOCUMENTS 3,761,813 9/1973 Perrin .

4,236,161 11/1980 Ohm .

5,017,925 5/1991 Bertiger et al. .......... 342/352

5,408,237 4/1995 Patterson et al. .......... 342/354

5,548,294 8/1996 Sturza .......... 342/372

*Primary Examiner*—Theodore M. Blum

*Attorney, Agent, or Firm*—Terry J. Anderson; Karl J. Hoch, Jr.

[57] ABSTRACT

A method and system provides for reduced interference from multipath reflections at the earth's surface during a communication between a vehicle traveling above the earth's surface and receivers at plural ground stations located distantly from each other on the earth's surface. Plural antenna elements are carried by the vehicle and oriented in different direction to provide electromagnetic beams at different orientations and different carrier frequencies. This provides wide area coverage while allowing a receiver to be tuned to a signal received from one antenna element while attenuating a multipath reflection at a carrier frequency utilized by another of the receivers.

14 Claims, 4 Drawing Sheets

PLURAL BEAM REDUCTION OF MULTIPATH REFLECTIONS

BACKGROUND OF THE INVENTION

This invention relates to a communication system for transmission of plural beams of radiation from an aircraft or other vehicle in different directions towards receiving stations on the earth, wherein all of the beams carry the same modulation and message, but may differ in carrier frequency and in times of energization, for reduction of multipath reflective interference from the earth's surface to the receiving stations.

In the transmission of electromagnetic signals from an aircraft flying above the earth to a receiver on the earth, it is recognized that, in addition to a reception of a directly transmitted beam, there may also be a reception of rays which have reflected from some object on the earth's surface. This gives rise to what is generally referred to as multipath reflections. The multipath reflections interfere with normal reception of signals by introducing delayed and possibly distorted reflected signals to the desired signals received via the directly transmitted beam. The multipath interference is generally minimal for transmissions which are normal to the earth's surface, but increases in the case of transmission of a wide beam which illuminates regions of the earth distant from the receiver by rays inclined to the earth's surface. The inclined rays are more apt to reflect from a structure (natural or man-made) on the earth's surface toward the receiver to generate the multipath reflection phenomena.

A problem arises in situations wherein it is desirable to transmit via a wide beam antenna to illuminate a relatively large portion of the earth's surface, thereby to communicate concurrently with numerous receiving stations located at various spaced-apart locations on the earth's surface. Typically, in such a situation, the aircraft is located above a first receiver which is viewed by the aircraft in a direction normal to the earth's surface, while a second receiver is viewed by a line of sight inclined to the earth's surface. Rays of radiation directed toward the second receiver may impinge on reflecting elements, such as rocks or buildings, in the vicinity of the second receiver and be reflected back to the first receiver. Thus, the first receiver receives a direct transmission, and a reflected transmission which interferes with the direct transmission.

Similarly, in the case of the second receiver, there may also be multipath reflections developed by rays inclined relative to a directly transmitted ray so as to reflect from a reflecting element in the vicinity of the second receiver. In the case of multipath reflections interfering with reception at the second receiver, a shift in carrier frequency may reduce the interference. However, in accordance with a further aspect of the foregoing problem, such frequency shift may be detrimental to operation of the first receiver which is tuned to the original carrier frequency.

SUMMARY OF THE INVENTION

The aforementioned problems are overcome and other advantages are provided by a communication system which reduces the effects of multipath reflections in the situation of wide area transmission from an aircraft above the earth's surface to multiple receiving stations on the earth's surface. This is accomplished, in accordance with the invention, by use of an antenna system carried by the aircraft for generating multiple beams for transmission of radiant signals from the aircraft or other vehicle to receiving stations on the earth. To provide the wide area coverage, the multiple beams are transmitted in different directions towards receiving stations on the earth. All of the beams carry the same modulation and message, but differ in carrier frequency. Also, one or more of the beams may be deactivated in situations wherein there are no receiving stations located in regions of the earth's surface illuminated by such beams. The deactivation of one or more of the beams serves to save power and, in the frequency domain, to reduce the frequency spectrum occupied by the transmissions.

By virtue of the use of different carrier frequencies among the various beams, an individual one of the receivers is able to filter out multipath reflections developed from transmissions at frequencies different from the frequency to which the one receiver is tuned. Also, if desired, by transmission of communications from the ground stations to the aircraft, requests may be made to introduce further frequency shift for further reduction of multipath reflection. Herein, the use of multiple transmission frequencies enables the shifting of one transmission frequency without effecting the transmissions at other carrier frequencies to other ones of the receivers. Knowledge of the position of the aircraft, as may be obtained by use of a Global Positioning System (GPS) or other self-location method, plus prior knowledge of the locations of the ground stations, permits transmissions to be discontinued to stations which are inactive.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION

Figure 1:
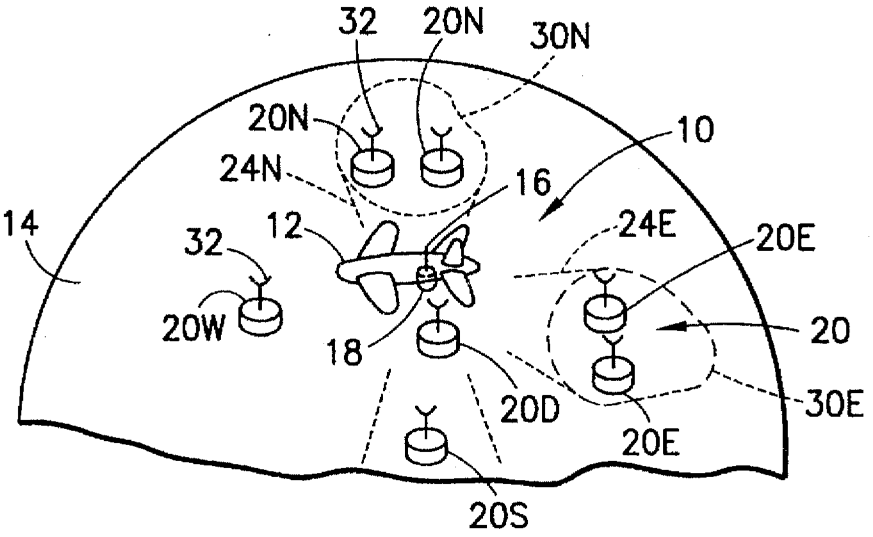
FIG. 1 shows a stylized view of an aircraft flying above the earth's surface, and carrying an antenna system constructed in accordance with the invention for transmission of signals to receiving stations on the earth's surface.

FIG. 1 shows a communication system 10 wherein, in accordance with the invention, an aircraft 12, or other type of airborne or space vehicle, travels above the surface 14 of the earth, and carries an antenna system 16 including an antenna assembly 18 for transmission of signals to ground stations 20 located on the earth's surface 14. The invention is explained most readily for the case of a ground station 20 located directly down from the aircraft 12, indicated by the station 20D, as well as stations located to the north, the south, the east, and the west of the aircraft 12 as indicated respectively by the stations 20N, 20S, 20E, and 20W. By way of further example, there are two stations 20E located easterly of the aircraft 12, and two stations 12N located northerly of the aircraft 12.

Figure 2:
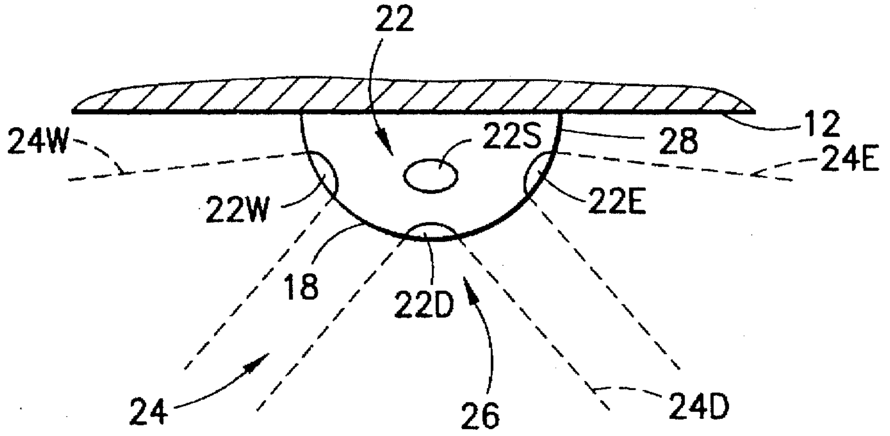
FIG. 2 shows a diagrammatic side elevation view of an antenna assembly of the antenna system of FIG. 1.
Figure 3:
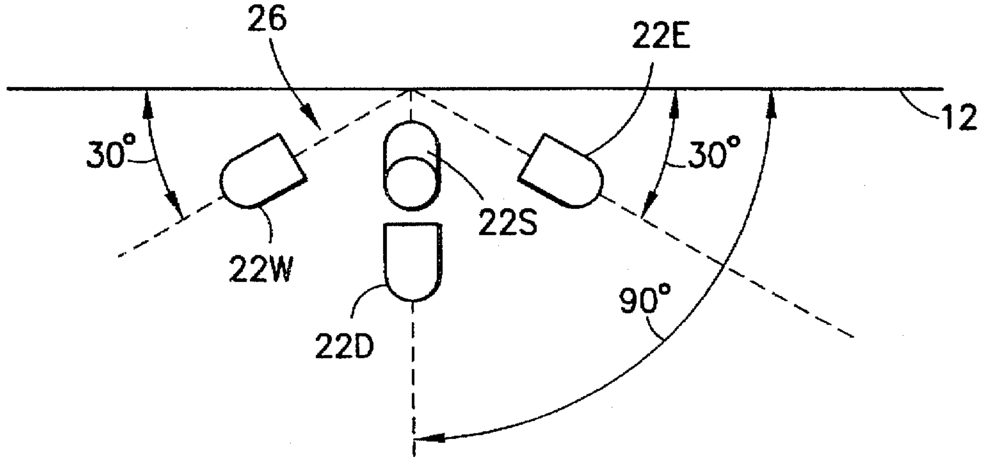
FIG. 3 shows diagrammatically orientations of various antenna elements of the assembly of FIG. 2.
Figure 4:
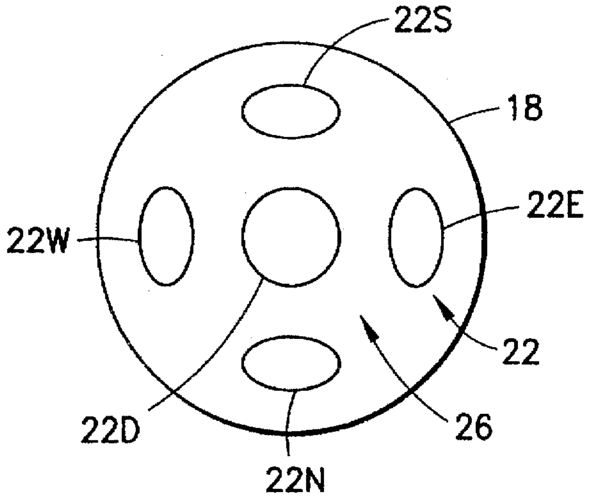
FIG. 4 is a a bottom view of the antenna assembly of FIG. 2 indicating diagrammatically the locations of the antenna elements.

The antenna assembly 18 comprises a plurality of antenna elements 22, shown in FIGS. 2, 3 and 4, for directing beams 24 of electromagnetic radiation toward the ground stations 20, and for transmitting electromagnetic signals via the beams 24 to the stations 20. In this embodiment of the invention, there are five of the antenna elements 22 identified as the antenna elements 22D, 22N, 22S, 22E, and 22W, and there are five of the beams 22 identified as the beams 24D, 24N, 24S, 24E, and 24W. The beams 24D, 24N, 24S, 24E, and 24W are transmitted respectively by the antenna elements 22D, 22N, 22S, 22E, and 22W respectively to the ground stations 20D, 20N, 20S, 20E, and 20W. The antenna elements 22 are arranged in a hemispherical array 26 within the confines of a hemispherical radome 28, wherein the antenna element 22D is located in the center of the array 26 and the antenna elements 22N, 22S, 22E, and 22W are arranged respectively in northerly, southerly, easterly, and westerly directions about the central element 22D. It is understood that the foregoing description of the arrangement of the antenna elements 22 is based on a presumed direction of orientation of the aircraft 12 toward the west, as shown in FIG. 1, and that the aircraft 12 may be oriented in other directions for generating the foregoing set of five beams 24.

Illuminated regions, or footprints, 30N and 30E of the beams 24N and 24W respectively on the earth's surface 14 are shown in FIG. 1 by way of example. In the region 30N, the beam 24N illuminates both of the stations 20N. In the region 30E, the beam 24E illuminates both of the stations 20E. The ground stations 20 have respective antenna assemblies 32 which enable reception of electromagnetic signals of the respective beams 24, and also enable communication of control signals from the respective ground stations 20 to the aircraft 12. By way of example, such control signals may include a request for a shift in frequency to reduce multipath interference, or to inform the aircraft 12 that a specific one of the ground stations 20 is going off the air and no longer requires transmission of the electromagnetic signals by a respective one of the beams 24.

Figure 5:
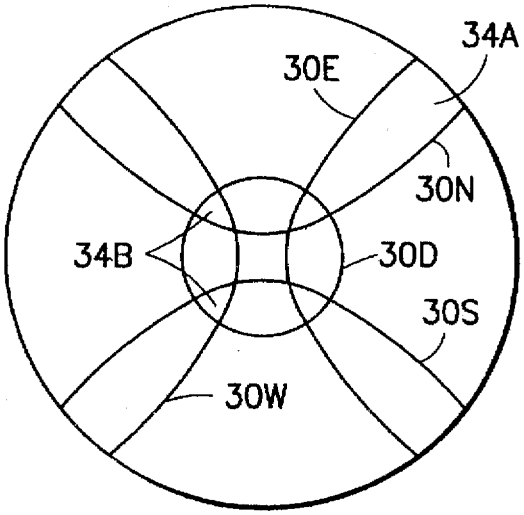
FIG. 5 shows beam footprints on the earth's surface provided by the antenna assembly.

FIG. 5 shows an array of the five beam footprints 30D, 30N, 30S, 30E, and 30W. This view is stylized, with the actual configuration of a footprint based on approximately an 8 dB (decibel) drop in power from a location of peak power being more complex. FIG. 5 demonstrates that there is some overlap between the central footprint 30D and each of the surrounding footprints 30N, 30S, 30E, and 30W. Furthermore, there is overlap between neighboring ones of the surrounding footprints, such as between the footprints 30N and 30E as shown at the overlap 34A. An overlap between three beams is shown at 34B. In a region of overlap, such as at 34A or 34B, the invention provides for a choice of beam to which a receiver on the earth may tune. This is accomplished by transmitting at three different frequencies wherein one frequency is employed for beam 24D to produce the footprint 30D, a second frequency is employed by both beams 24N and 24S to produce the footprints 30N and 30S, and a third frequency is employed by both beams 24E and 24W to produce the footprints 30E and 30W.

With respect to the generation of multipath interference, as has been noted above, the interference is generally less for vertical narrow-beam illumination of a receiving station, but increases for wide beam illumination wherein inclined rays of radiation are apt to reflect from distant sources of reflection back toward the receiving station. This is demonstrated in FIG. 6 wherein the aircraft 12 flies above a ground station 20 and a reflecting object 36 located on the earth's surface 14. A wide beam illumination of the earth's surface 14 is represented by a vertical central ray 38 and two slant rays 40 and 42 which serve to define the outer limits of a wide beam radiation pattern. The vertical ray 38 propagates directly from the antenna assembly 18 of the aircraft 12 to a receiver 44 at the ground station 20. The slant rays 40 and 42 are on opposite sides of the vertical ray 38 and are symmetric about the vertical ray 38. By way of example, the slant ray 42 is reflected by the object 36 back to the ground station 20 as a multipath reflected signal which interferes with operation of the receiver 40 in the reception of the directly transmitted signal of the ray 38. In the prior art, such a wide area illumination of the earth's surface would be accomplished by use of radiation at a single carrier frequency, this resulting in the aforementioned multipath interference.

Figure 6:
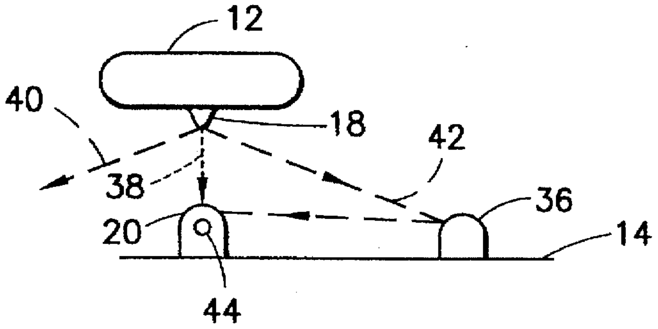
FIG. 6 is a diagram of a direct transmission and a multipath transmission between an aircraft and a ground station.

However, in accordance with the invention, such wide area illumination is accomplished by use of radiation at plural carrier frequencies, wherein, as shown in FIG. 5, the central region of the illumination at the footprint 30D is accomplished by the first of the three carrier frequencies while illumination of the outer regions of the illumination at the footprints 30N, 30S, 30E, and 30W is accomplished at the second and the third of the carrier frequencies. Each of the ground stations 20 has a receiver 44 is tuned to a specific carrier frequency of the signal transmitted from the aircraft 12 to the respective ground station. Use of the foregoing set of three different frequencies allows the receivers 44 at various ones of the ground stations 20 to be tuned to different frequencies. This permits a receiver 44 tuned to a direct transmission at a first carrier frequency to attenuate a multipath reflected signal at a second carrier frequency. With reference to FIGS. 5 and 6, the ground station 20 located beneath the aircraft 12 would be illuminated within the center footprint 30D at the first of the aforementioned set of frequencies via the direct ray 38, and the object 36 would be illuminated within the easterly footprint 30E at the third of the aforementioned set of frequencies via the slant ray 42. Due to the difference in frequencies, the receiver 44 is able to filter out the multipath reflected signal.

It is noted also that, even in an outer region of the illuminated area, a ground station, such as the ground station 20W of FIG. 1, can be subjected to multipath reception. This arises by illumination of the ground station 20W directly, as by the slant ray 40 (FIG. 6), and also by a nearby ray (not shown) which reflects from a nearby rock or other obstacle to the ground station 20W. Often, such multipath reception is frequency sensitive. In such a situation, a slight change in the carrier frequency of the signal transmitted to the footprint 30W results in a frequency shift to both the radiations of the slant ray 40 and the nearby ray for reduction of the reflected multipath signal. The frequency shift changes the wavelength of the transmitted signal, thus changing the amplitude of the direct and reflected signal. Accordingly, the invention provides also for the capability to introduce a shift to the carrier frequency of the signal transmitted by the antenna element 22W, as will be described hereinafter.

In a preferred embodiment of the invention, the antenna elements 22 are spaced apart from each other by distance equal to at least a few wavelengths of the transmitted signal to insure independence of operation of the antenna elements 22 in forming their respective beams. Each of the antenna elements 22 may have a circular radiating aperture with a width or diameter equal approximately to two of the wavelengths to provide beam widths in the order of 30–40 degrees. The outer ones of the antenna elements 22, namely the elements 22N, 22S, 22E, and 22W, have their longitudinal axes inclined by approximately 30 degrees relative to a horizontal plane of a surface region of the aircraft 12, as shown in FIG. 3. The orientation of the center element 22D perpendicularly to the foregoing plane of the region of the aircraft surface is shown also in FIG. 3. Overlap of neighboring beams, such as shown at 34A in FIG. 5, is approximately 5 degrees in the preferred embodiment of the invention. The radiation emitted by each of the antenna elements 22 is circularly polarized to reduce the effect of the multipath. The power at the center beam is dominant over the power of the beams of the outer antenna elements 22N. 22S, 22E, and 22W to reduce an effect of scalloping which may be observed in the presence of two signals incident upon a common receiver antenna. In the case of a ground station 20 illuminated by plural beams 24 at plural frequencies, the station 20 can choose the beam having the strongest signal by tuning by tuning its receiver 44 to the frequency of the strongest beam 24.

The arrangement of the four antenna elements 22N. 22S, 22E, and 22W about the central antenna element 22D, as shown in FIG. 4, is presented by way of example in construction of a preferred embodiment of the invention. However, the principles of the invention apply also to arrangements of antenna elements located about a central element wherein six or possibly eight outer elements, by way of example, surround the central element. The additional elements permit the use of additional carrier frequencies for further versatility in the selection of appropriate values of frequency to reduce multipath interference. However, such use of additional frequencies intrude on the frequency spectrum available for other communication functions and, also, additional antenna elements increase complexity of the equipment carried by the aircraft 12. The use of the four antenna elements encircling a central element in the preferred embodiment of the invention is believed to be the best compromise between the capacity to avoid multipath interference, and the need to conserve available frequency space and avoid excessive complexity of equipment.

Figure 7:
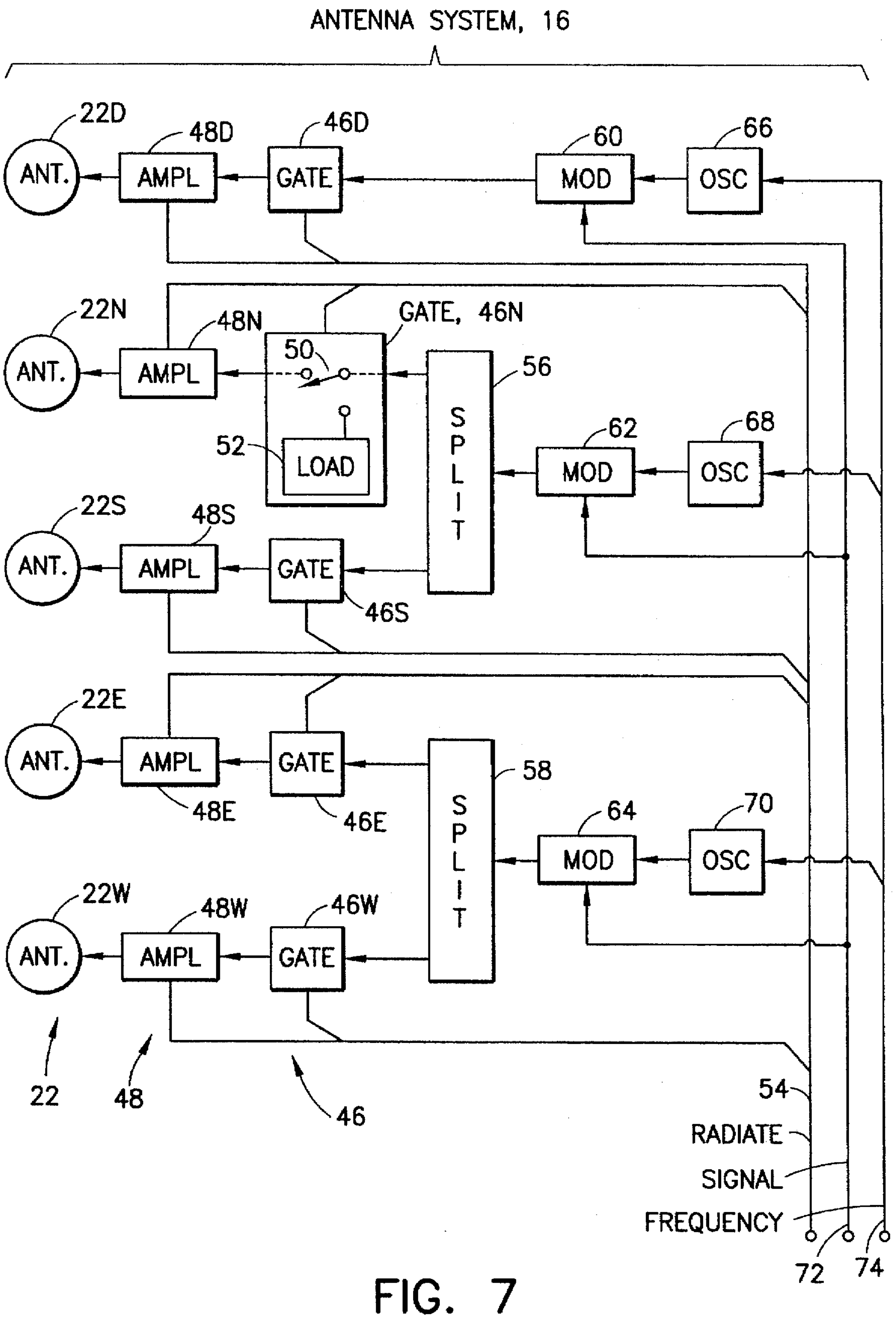
FIG. 7 is a block diagram of the antenna system of FIG. 1.

FIG. 7 shows details in the construction of the antenna system 16 (FIG. 1) with its array of antenna elements 22 (FIG. 4). The antenna system 16 comprises a set of gates 46 coupled by a set of amplifiers 48 to respective ones of the antenna elements 22. The gates 46 are operative to pass microwave signals via the amplifiers 48 to be radiated from respective ones of the antenna elements 22, or to selectively terminate flow of microwave energy to any one or group of the antenna elements 22. By way of example, a gate 46 may include a waveguide circuit comprising a microwave switch 50 and a dummy load 52, wherein the switch 50 is responsive to a control signal provided on a respective one of a set of gate control lines 54 for direction of a microwave signal to the respective amplifier 48 or to the dummy load. The amplifiers 48 provide the function of amplifying the signals received from the respective gates 46 to a suitable power level for radiation from the respective antenna elements 22. Gate signals of the respective control lines 54 are applied also to the amplifiers 48 for deactivating one or more of the amplifiers 48 in the respective signal channels for which a gate 46 has been operated to terminate signal flow to the amplifier 48. This conserves power in the situation wherein one or more of the antenna elements 22 are not required for transmission to the various ground stations 20 (FIG. 1). For ease of reference, the amplifier and the gate which feed the antenna element 22D may be identified further as amplifier 48D and gate 46D, with similar notation being employed for other ones of the signal channels such as the amplifier 48W and gate 46W which drive the antenna element 22W. The radiation of electromagnetic power selectively from various ones of the antenna elements 22 may be likened to a Fresnel plate (not shown) wherein radiation emanates only selectively from certain areas of the plate.

The antenna system 16 further comprises two power splitters 56 and 58, three modulators 60, 62 and 64 which may be phase modulators by way of example, and three oscillators 66, 68 and 70. The oscillator 66 generates a first carrier at a first frequency. The modulator 60 modulates the first carrier with an outgoing signal provided via signal line 72, and outputs a first modulated carrier signal to the gate 46D for transmission via the amplifier 48D to the antenna element 22D. The oscillator 68 generates a second carrier at a second frequency. The modulator 62 modulates the second carrier with the outgoing signal provided via signal line 72, and outputs a second modulated carrier signal via the splitter 56 to the gates 46N and 46S for transmission via the amplifiers 48N and 48S to the antenna elements 22N and 22S. The oscillator 70 generates a third carrier at a third frequency. The modulator 64 modulates the third carrier with the outgoing signal provided via signal line 72, and outputs a third modulated carrier signal via the splitter 58 to the gates 46E and 46W for transmission via the amplifiers 48E and 48W to the antenna elements 22E and 22W. The splitter 56 divides power of the second modulated carrier evenly between the antenna elements 22N and 22S. The splitter 58 divides power of the third modulated carrier evenly between the antenna elements 22E and 22W. A set of frequency control lines 74 connect with respective ones of the oscillators 66, 68 and 70 for controlling the frequencies of the respective oscillators, thereby to enable adjustment of a carrier frequency as may be useful for reduction of multipath interference.

Figure 8:
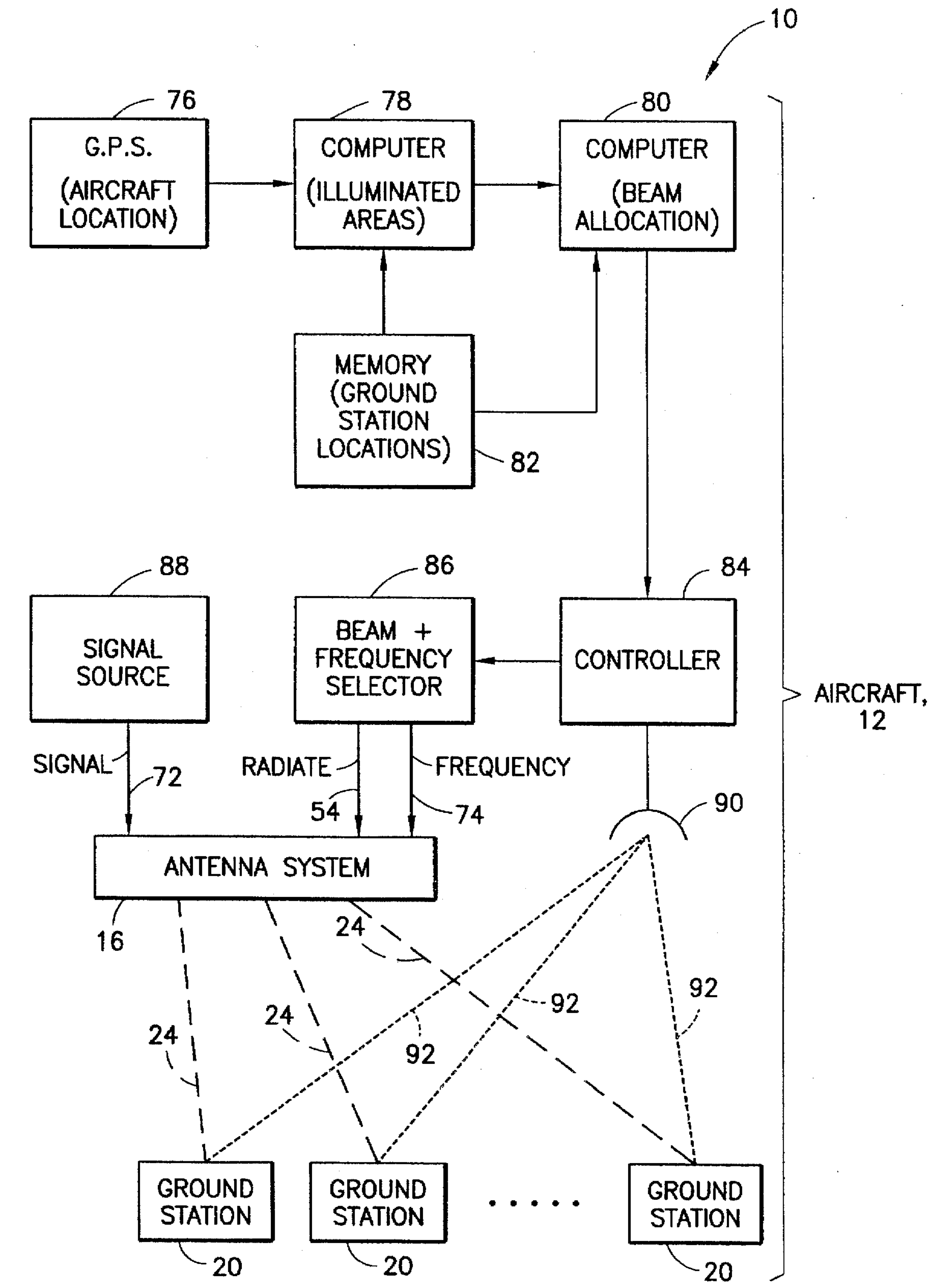
FIG. 8 is a block diagram of the communication system of the invention, including the antenna system of FIG. 1.

FIG. 8 shows details in the construction of the communication system 10 of FIG. 1. The system 10 comprises a GPS 76 carried by the aircraft 12 and providing location, in three dimensions, of the aircraft 12. Also carried by the aircraft 12 and included within the system 10 are two computers 78 and 80, a memory 82, a controller 84, a beam and frequency selector 86, and a signal source 88. In operation, the memory 82 stores locations of the ground stations 20 (FIG. 1). The computer 78 employs aircraft location provided by the GPS 76 and locations of the ground stations provided by the memory 82 to compute the areas of the earth's surface illuminated by each of the beams 24. The computer 80 employs the locations of the ground stations provided by the memory 82, and the illuminated areas provided by the computer 78 to determine which ground stations are being illuminated by which ones of the beams 24. It is understood that the two computer 78 and 80 are provided to facilitate explanation of the invention, and that, in practice, a single computer may be employed to provide the functions of the two computers 78 and 80. The information outputted by the computer 80 is applied to the controller 84 which assigns specific ones of the beams 24 and their carrier frequencies for transmission to various ones of the ground stations 20.

The controller 84 directs the selector 86 to output the requisite frequency control signals on the control lines 74 (FIGS. 7 and 8) for operation of the oscillators 66, 68 and 70. The controller 84 also directs the selector 86 to output the requisite gate control signals on the control lines 54 (FIGS.

7 and 8) for operation of the gates 46 and the amplifiers 48 to obtain radiation of signals from various ones of the antenna elements 22. The signal source 88 provides the signal which is to be transmitted by the antenna elements 22, the signal of the source 88 being coupled via the signal line 72 (FIGS. 7 and 8) to the modulators 60, 62 and 64 of the antenna system 16. The controller 84 may be provided with a communications antenna 90 enabling two-way communication, indicated by rays 92, between the controller 84 and each of the ground stations 20. Via the communications antenna 90, the ground stations 20 can communicate requests for shifts in one or more of the carrier frequencies transmitted via the beams 24 from the antenna system 16 to the respective ground stations 20.

By way of example, in the event that a ground station 20 experiences signal fading associated with multipath interference, the ground station 20 can request a slight shift in frequency to reduce the interference. Assuming that the ground station 20 is illuminated by the antenna element 22N, such a frequency shift would affect other ground stations illuminated by the antenna element 22N, and also ground stations illuminated by the antenna element 22S. The shifting of frequency to the carriers of signals transmitted by both of the antenna elements 22N and 22S arises because of the splitting of the signal of the oscillator 68 by the splitter 56 between the two antenna elements 22N and 22S. Ground stations 20 illuminated by other ones of the antenna elements 22 would not be affected by the foregoing frequency shift. Thereby, the invention provides for an efficient use of power in conjunction with reduction of multipath interference during transmission of signals by the antenna system 16 to numerous ground stations 20.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A communication system including an antenna system to be carried by a vehicle traveling above the earth's surface for communication with plural receivers located distant from each other on the earth's surface, the antenna system comprising:

means for generating a signal to be transmitted from said vehicle to said receivers;

carrier means for providing a plurality of carriers at a plurality of respective carrier frequencies;

modulation means for modulating each of said carriers with said signal to provide a set of modulated carriers;

beam-forming means for generating a plurality of beams, said beams being directed in different directions from said vehicle to said receivers allowing individual ones of said receivers to be illuminated by different individual ones of said beams;

transmission means for transmitting each of said modulated carriers via at least one of said beams, a carrier frequency of at least one of said beams being different from a carrier frequency of another of said beams;

wherein, in said communication system, each of said receivers has means for tuning the receiver to one of said carrier frequencies, respective ones of a plurality of said receivers being tuned to respective ones of said carrier frequencies to enable receptions of said signal at different locations via different carrier frequencies for reduction of multipath interference;

said beam-forming means includes an array of antenna elements comprising a central antenna element surrounded by a set of peripheral antenna elements, respective ones of said antenna elements providing respective ones of said beams;

said carrier means is operative to adjust a value of an individual one of said carrier frequencies;

said communication system further comprises a communication link between an individual one of said receivers and said vehicle for directing said carrier means to adjust a value of a carrier frequency;

said central antenna element is operative at a first carrier frequency, and said set of peripheral antenna elements is operative at a set of carrier frequencies different from said first carrier frequency;

on the earth's surface, a portion of one of said beams overlaps a portion of another of said beams to form an overlap region; and in each of said receivers, each of said tuning means has a signal strength selector for selecting a strongest of a plurality of said modulated carriers, and upon illumination of an individual one of said receivers within said overlap region, said signal strength selector enables said tuning means to tune to a modulated carrier having a largest signal strength.

2. A communication system according to claim 1 wherein, in said beam-forming means, respective ones of said antenna elements provide respective ones of said beams.

3. A communication system according to claim 1 wherein any one of said receivers may be activated for receiving the signal or deactivated, the communication system further comprising vehicle locator means for providing a location of said vehicle, a memory for storing locations of said receivers, computer means responsive to locations of said vehicle and said receivers to determine which of said receivers is illuminated by which of said beams, and power means directed by said computer means for deactivating an individual one of said beams directed toward a deactivated one of said receivers.

4. A communication system according to claim 1 wherein said set of peripheral antenna elements are arranged with radial symmetry about said central antenna element.

5. A communication system according to claim 4 wherein there are four of said peripheral antenna elements.

6. A communication system according to claim 5 wherein each of said antenna elements has a diameter in excess of approximately ten wavelengths of a carrier transmitted by the antenna element, and wherein said antenna elements are spaced apart from each other by multiple wavelengths.

7. A communication system according to claim 6 wherein said array of antenna elements is a hemispherical array with the central antenna element pointing downward from said vehicle toward the earth, the peripheral antenna elements being oriented with respective central axes of the peripheral antenna elements inclined relative to a central axis of the central antenna element.

8. A communication system according to claim 5 wherein a first of said peripheral antenna elements is directed in a generally northerly direction from said central antenna element, a second of said peripheral antenna elements is directed in a generally southerly direction from said central antenna element, a third of said peripheral antenna elements is directed in a generally easterly direction from said central antenna element, and a fourth of said peripheral antenna elements is directed in a generally westerly direction from said central antenna element.

9. A communication system according to claim 8 wherein respective beams of individual ones said peripheral antenna elements partially overlap the beams of neighboring ones of said peripheral antenna elements.

10. A communication system according to claim 9 wherein respective beams of individual ones said peripheral antenna elements partially overlap a beam of said central antenna element.

11. A communication system according to claim 8 wherein said first and said second peripheral antenna elements are operative at a second carrier frequency, and said third and said fourth antenna elements are operative at a third carrier frequency.

12. A method of communicating between a vehicle traveling above the earth's surface and plural receivers located distant from each other on the earth's surface, the method comprising steps of:

generating a signal to be transmitted from said vehicle to said receivers;

providing a plurality of carriers at a plurality of respective carrier frequencies;

modulating each of said carriers with said signal to provide a set of modulated carriers;

establishing an array of antenna elements comprising a central antenna element surrounded by a set of peripheral antenna elements;

generating a plurality of beams by means of said antenna elements wherein respective ones of said antenna elements provide respective ones of said beams, said beams being directed in different directions from said vehicle to said receivers allowing individual ones of said receivers to be illuminated by different individual ones of said beams, wherein on the earth's surface, a portion of one of said beams overlaps a portion of another of said beams to form an overlap region;

operating said central antenna element at a first carrier frequency, and operating said set of peripheral antenna elements at a set of carrier frequencies different from said first carrier frequency;

transmitting each of said modulated carriers via at least one of said beams, a carrier frequency of at least one of said beams being different from a carrier frequency of another of said beams;

at each of said receivers, tuning the receiver to one of said carrier frequencies, respective ones of a plurality of said receivers being tuned to respective ones of said carrier frequencies to enable receptions of said signal at different locations via different carrier frequencies for reduction of multipath interference;

providing said communication system with a communication link between an individual one of said receivers and said vehicle for directing an adjustment in a value of a carrier frequency; and in each of said receivers, selecting a strongest of a plurality of said modulated carriers and, upon illumination of an individual one of said receivers located within said overlap region, said tuning step includes a tuning of said individual receiver to a modulated carrier having a largest signal strength.

13. A method according to claim 12 wherein said set of peripheral antenna elements comprises four peripheral antenna elements, the array of antenna elements being carried by the vehicle;

said step of generating beams includes steps of:

directing a beam of the central antenna element toward the earth;

inclining a beam of a first of the peripheral antenna elements in a direction generally northerly of the beam of the central antenna element;

inclining a beam of a second of the peripheral antenna elements in a direction generally southerly of the beam of the central antenna element;

inclining a beam of a third of the peripheral antenna elements in a direction generally easterly of the beam of the central antenna element; and inclining a beam of a fourth of the peripheral antenna elements in a direction generally westerly of the beam of the central antenna element.

14. A method according to claim 13 wherein said step of operating said set of peripheral antenna elements at a set of carrier frequencies different from said first carrier frequency includes steps of operating said first and said second antenna elements at a second carrier frequency, and operating said third and said fourth antenna elements at a third carrier frequency.

* * * * *